United States Patent
Tanaka et al.

(10) Patent No.: US 9,379,529 B2
(45) Date of Patent: Jun. 28, 2016

(54) ELECTRICAL JUNCTION BOX

(71) Applicant: Yazaki Corporation, Minato-ku, Tokyo (JP)

(72) Inventors: Yasuhiro Tanaka, Kakegawa (JP); Naoto Takashima, Kakegawa (JP); Kouichirou Tou, Kakegawa (JP); Junya Yamamoto, Kakegawa (JP); Yoshiyuki Ishihara, Toyota (JP); Takanori Kawai, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 35 days.

(21) Appl. No.: 14/528,301

(22) Filed: Oct. 30, 2014

(65) Prior Publication Data

US 2015/0047870 A1    Feb. 19, 2015

Related U.S. Application Data

(63) Continuation of application No. PCT/JP2013/063230, filed on May 2, 2013.

(30) Foreign Application Priority Data

May 2, 2012   (JP) ................................. 2012-105038

(51) Int. Cl.
*H02G 3/16* (2006.01)
*B60R 16/023* (2006.01)
(Continued)

(52) U.S. Cl.
CPC .............. *H02G 3/16* (2013.01); *B60R 16/0238* (2013.01); *H01R 9/16* (2013.01); *H01R 2201/26* (2013.01); *H02G 3/086* (2013.01); *H02G 3/088* (2013.01)

(58) Field of Classification Search
USPC ........................................................... 174/60
See application file for complete search history.

(56) References Cited

U.S. PATENT DOCUMENTS

| | | | |
|---|---|---|---|
| 1,762,525 A * | 6/1930 | Rah ......................... | H02G 3/18 361/642 |
| 7,494,348 B1 * | 2/2009 | Tyler .................. | B60R 16/0215 439/76.2 |
| 2004/0027767 A1 | 2/2004 | Kawabata et al. | |

(Continued)

FOREIGN PATENT DOCUMENTS

| CN | 101577405 A | 11/2009 |
|---|---|---|
| CN | 201616626 U | 10/2010 |

(Continued)

OTHER PUBLICATIONS

International Search Report dated Sep. 27, 2013 issued in International Application No. PCT/JP2013/063230.

(Continued)

*Primary Examiner* — Dhirubhai R Patel
(74) *Attorney, Agent, or Firm* — Sughrue Mion, PLLC

(57) ABSTRACT

An electrical junction box for connecting a power supply and a load, includes a terminal block that holds a conductor to which a first electric wire and a second electric wire are commonly connected, wherein first electric wire is connected to the power supply and the second electric wire is connected to the load, a conductive case that accommodates the terminal block, and a resin insulative member that is attached along an inner wall surface of the case. Crimped terminals which are connected respectively to ends of the first and second electric wires are fastened to the conductor with fastening members.

4 Claims, 9 Drawing Sheets

(51) Int. Cl.
  *H01R 9/16* (2006.01)
  *H02G 3/08* (2006.01)

(56) References Cited

U.S. PATENT DOCUMENTS

| | | |
|---|---|---|
| 2004/0252446 A1 | 12/2004 | Friedrich et al. |
| 2007/0167040 A1 | 7/2007 | Ogawa et al. |
| 2009/0035974 A1 | 2/2009 | Tyler et al. |
| 2009/0280661 A1 | 11/2009 | Akahori |
| 2011/0094794 A1 | 4/2011 | Asao |
| 2015/0050831 A1 | 2/2015 | Tanaka et al. |

FOREIGN PATENT DOCUMENTS

| | | |
|---|---|---|
| EP | 1 482 530 A1 | 12/2004 |
| EP | 2 020 701 A1 | 2/2009 |
| JP | 2002330529 A | 11/2002 |
| JP | 200479576 A | 3/2004 |
| JP | 2008288529 A | 11/2008 |
| JP | 200938966 A | 2/2009 |
| JP | 201197711 A | 5/2011 |
| JP | 2012-10590 A | 1/2012 |
| JP | 2013232377 A | 11/2013 |

OTHER PUBLICATIONS

Written Opinion dated Sep. 27, 2013 issued in International Application No. PCT/JP2013/063230 (PCT/ISA/237).

Office Action issued on Dec. 8, 2015 by the European Patent Office in counterpart European Application No. 13723989.3.

Office Action issued on Nov. 26, 2015 by the State Intellectual Property Office of P.R. China in counterpart Chinese Application No. 201380023081.0.

Office Action dated Jan. 5, 2016, issued by the Japanese Intellectual Property Office in counterpart Japanese Application No. 2012-105038.

\* cited by examiner

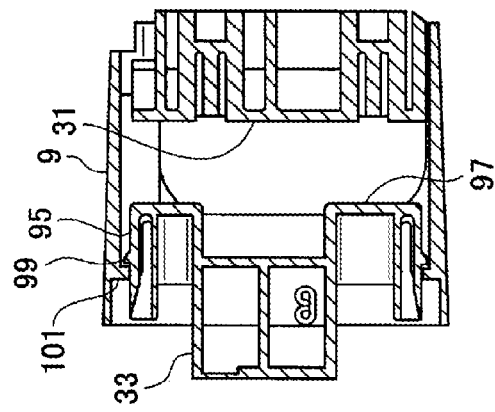
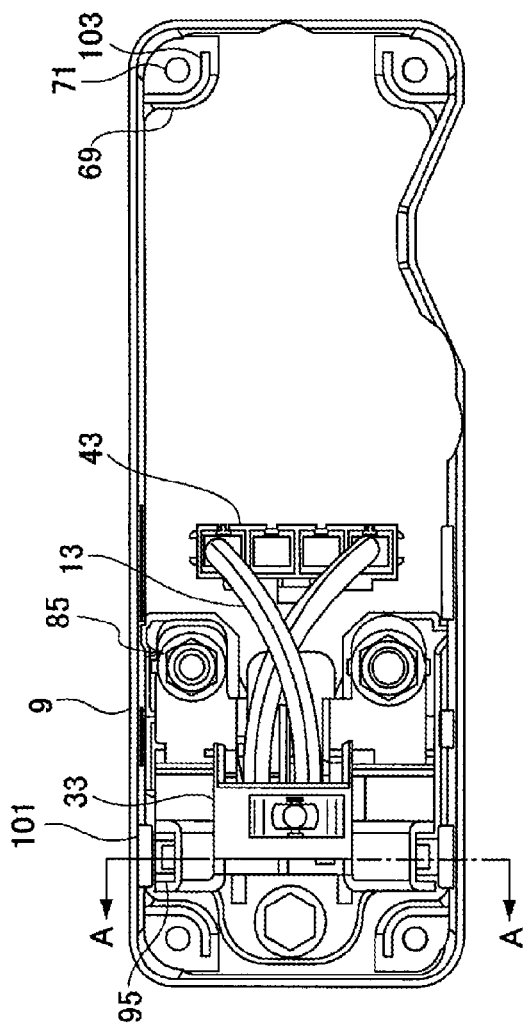

ELECTRICAL JUNCTION BOX

CROSS REFERENCE TO RELATED APPLICATIONS

This application is a continuation of PCT application No. PCT/JP2013/063230, which was filed on May 2, 2013 based on Japanese Patent Application (No. 2012-105038) filed on May 2, 2012, the contents of which are incorporated herein by reference.

BACKGROUND OF THE INVENTION

1. Field of the Invention

The present disclosure relates to an electrical junction box, and particularly to an electrical junction box which is loaded on a movable object such as an electric car and which accommodates electrical components.

2. Description of the Related Art

For example, in an electric vehicle which is driven by using an electric motor, typically, an electrical junction box which accommodates electrical components which connect a power supply and a plurality of loads is loaded. This electrical junction box is constructed by accommodating an insulative component which holds conductors such as bus bars in a case, and a plurality of electric wires connected to the power supply side or the load side are connected to the bus bars through crimped terminals, respectively. The case of this kind of electrical junction box is formed of metal to make the shielding property last (For example, refer to JP-A-2012-10590).

SUMMARY OF THE INVENTION

In this kind of electrical junction box, to prevent a short circuit of the conductors accommodated in the case and the case, for example, an insulation process such as coating the conductors with resin is performed. However, because such a construction causes upsizing of the components and complexity of the structure in addition to the increase of the manufacturing procedures of the components accommodated in the case, the production cost of the components becomes higher. Further, because the operation space in the case gets small when the components are assembled in the case, there is a problem that the efficiency of the assembling operation decreases.

The object of the present disclosure is that a short circuit of the case and the conductors can be prevented while the shielding performance is maintained, the cost is decreased and the efficiency of the operation of assembling the components is improved.

The present disclosure has been made in the above circumstances in the art, and an object of the present disclosure is to provide an electrical junction box for connecting a power supply and a load, comprising:

a terminal block that holds a conductor to which a first electric wire and a second electric wire are commonly connected, the first electric wire being connected to the power supply and the second electric wire being connected to the load;

a conductive case that accommodates the terminal block; and a resin insulative member that is attached along an inner wall surface of the case, wherein crimped terminals which are connected respectively to ends of the first and second electric wires are fastened to the conductor with fastening members.

According to this aspect, because the inner wall surface of the case can be simply covered with the insulative member, without coating the conductors accommodated in the case, a short circuit of the conductors and the case can be prevented. Because a resin molded article which can be attached to the inner wall surface of the case can be used as the insulative member, the production cost can be reduced in comparison with that the conductors are coated with resin. Furthermore, because the insulative member is attached along the inner wall surface of the case, when electrical components are assembled in the case, it can be prevented that the particular operation space gets extremely small, the operation space can be secured to be large, and the efficiency of the assembling operation can be improved.

For example, the crimped terminal connected to the second electric wire is pivotally supported by a columnar projection, which is protruded from the terminal block, and is fastened with the fastening member, and also the inner wall surface of the insulative member has a stepped part which regulates a rotation of the crimped terminals with the fastening member when the fastening member is fastened, the stepped part being project from the inner wall surface at a position where to the stepped part abuts with the crimped terminal.

That is, when the crimped terminal of the electric wire is fastened with the fastening member, for example, a nut while being rotatably supported by the projection, the crimped terminal may rotate in the direction where the nut rotates due to the friction of the nut and the crimped terminal, but by providing the stepped part of the insulative member at the position where it is possible to abut with the crimped terminal, the rotation of the crimped terminal with the fastening member can be inhibited since the crimped terminal abuts with the stepped part.

For example, the insulative member has a projecting plate which projects perpendicularly from the inner wall surface of the insulative member, and the projecting plate has an insertion hole for a bolt which fixes the insulative member to a bottom part of the case and a rib which surrounds a head of the bolt inserted into the insertion hole.

According to this aspect, because the head of the bolt is surrounded by the insulative rib, a short circuit of the conductor accommodated in the case and the bolt can be prevented. Because the contact of the conductor accommodated in the case and the bolt can be prevented, the electric wire can be prevented from being worn because the electric wire contacts the bolt to receive vibration from the outside.

For example, a convex part which presses the insulative member to the case is provided on a surface of the terminal block, the surface of the terminal block facing the inner wall surface of the insulative member.

That is, if a resin molded article is used as the insulative member, in the insulative member which is attached into the case, a curve to the inner side of the case may occur, and the operation space in the case might get small. In contrast, since the curve of the insulative member can be corrected by providing the terminal block with the convex parts that press the insulative member towards the side of the case, a drop of the operation efficiency due to the decrease of the operation space can be prevented.

For example, other crimped terminal is connected to one end of the first electrical wire and is attached to a connector arranged at a bottom part of the case, the crimped terminal is connected to the other end of the first electrical wire and is held to an insulative resin block, the insulative resin block is so formed that when the insulative resin block is attached onto the terminal block, the crimped terminal connected to the other end of the first electric wire is arranged at a position where the crimped terminal is connected to the conductor, and the insulative resin block and the insulative member are provided with locking mechanisms which are engaged with each other when the crimped terminal connected to the other end of the first electric wire is fastened to the conductor with a fastening member, the locking mechanisms regulates a movement of the insulative resin block in a direction opposite to a direction in which the insulative resin block is attached to the insulative member.

That is, the insulative resin block is connected to the connector located at the bottom part of the case through the first electric wire, but in such a state, in order to connect the crimped terminal, when the insulative resin block is attached onto the terminal block, the crimped terminal must be fastened to the conductor with the fastening member while the electric wires are curved largely. At this time, the insulative resin block rises from the terminal block due to the reaction force of the curved electric wires, and the operation efficiency might decrease. In this regard, since the insulative resin block and the insulative member are provided with the locking mechanisms which regulate the movement of the insulative resin block in a direction opposite to the direction in which the insulative resin block is attached to the insulative member, namely, the rise of the insulative resin block from the insulative member, the operation of connecting the crimped terminals at the other ends and the conductors can be performed efficiently.

According to the present disclosure, a short circuit of the case and the conductors can be prevented while the shielding performance is maintained, the cost is decreased and the efficiency of the operation of assembling the components is improved.

BRIEF DESCRIPTION OF THE DRAWINGS

FIG. 6A is a top view showing the structure of locking mechanisms of a resin block, and FIG. 6B is a sectional view from the direction B-B arrows of FIG. 6A.

DETAILED DESCRIPTION OF THE EXEMPLARY EMBODIMENTS

Next, an embodiment of the electrical junction box of the invention will be described with reference to the figures. In this embodiment, an example is described in which the electrical junction box according to the present disclosure is applied to an electrical junction box which is loaded in an electric car, but the present disclosure is not limited to this example, and, for example, the electrical junction box can be applied to an electrical junction box which is loaded in various kinds of movable objects such as hybrid cars.

Figure 1:
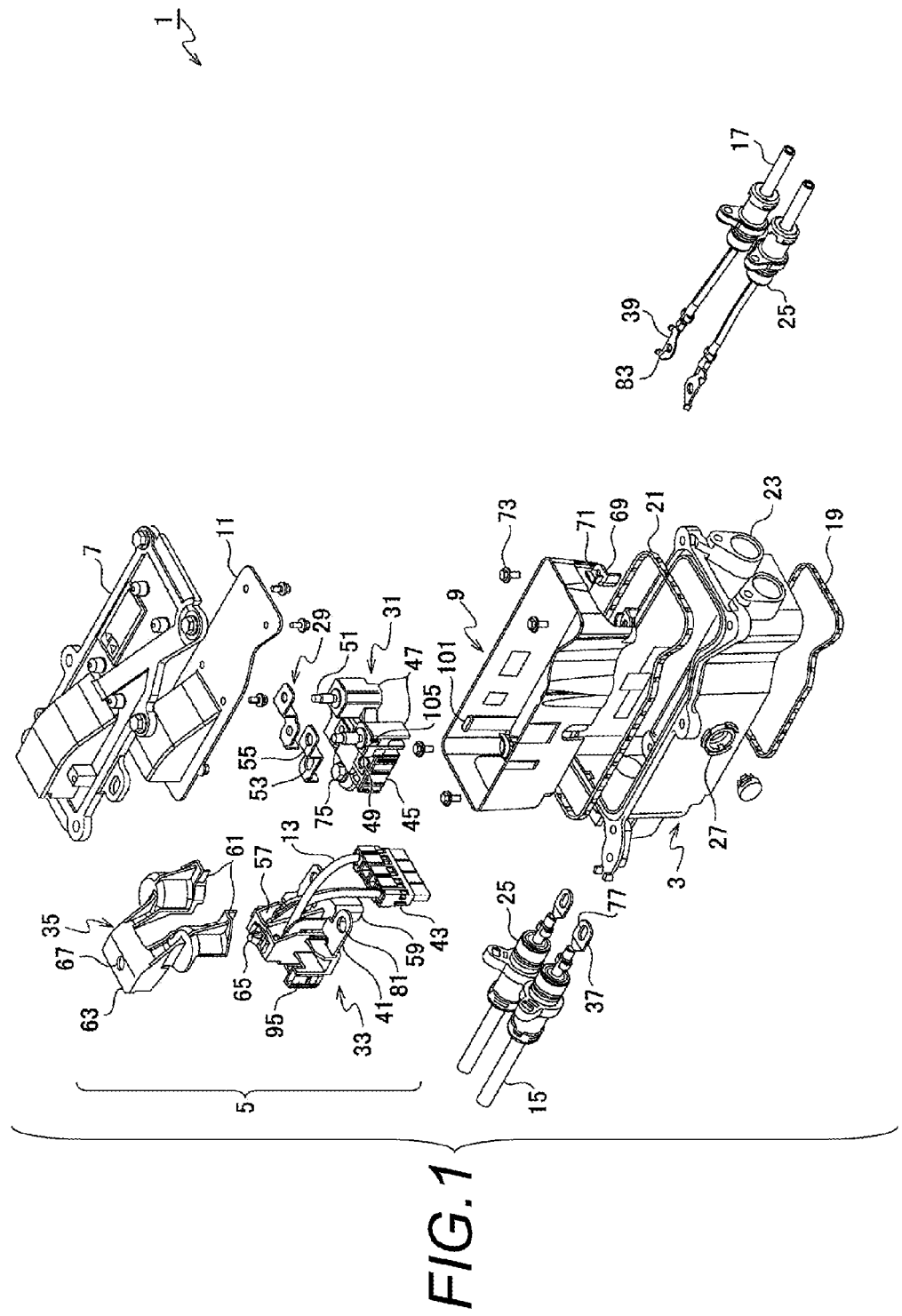
FIG. 1 is an exploded perspective view in which an electrical junction box according to the present disclosure is decomposed.

As shown in FIG. 1, an electrical junction box 1 according to the present disclosure has a case 3, electrical components 5 accommodated in the case 3, a cover 7, an insulative member 9, an insulative lid 11, electric wires 13 (first electric wire) connected to the side of a power supply, electric wires 15 connected to the side of a battery, and electric wires 17 (second electric wire) connected to the side of an electric motor, and connects the power supply with a plurality of loads (herein, the electric motor and the battery).

The case 3 is a frame-like member whose section in a top view is formed into a rough rectangle. The case 3 has opening parts at both ends. One opening part is connected to another component (a converter or the like) not shown in the figure, and the other opening part is sealed by being covered with the cover 7. The waterproofness of the case 3 is secured by providing a lower packing 19 at the part where the other component abuts against the one opening part, and providing an upper packing 21 at the part where the cover 7 abuts against the other opening part of the case 3. The case 3 is formed of metal to secure the shielding performance of the electrical junction box 1.

Two side walls of the case 3, which are opposite to each other, are provided with a pair of electric wire through holes 23 through which the electric wires 15 and 17, which are respectively connected to the electrical components 5 in the case 3, are inserted, and grommets 25 which protect the electric wires 15 and 17 are fitted and installed into these electric wire through holes 23.

One side wall of the case 3 where the electric wire through holes 23 are not formed is provided with a differential pressure adjusting valve 27 from which gas is introduced into the case 3 to raise the waterproofness of the case 3. By introducing gas into the case 3 from the differential pressure adjusting valve 27, and maintaining the pressure in the case 3 to be higher than the outside pressure, the invasion of, for example, water from the outside is prevented and high waterproofness is secured.

The electrical components 5 includes bus bars (conductors) 29 to which the electric wires 13 connected to the side of the power supply, the electric wires 15 connected to the side of the battery and the electric wires 17 connected to the side of the electric motor are commonly connected, a terminal block 31 which holds the bus bars 29, a resin block 33 which is attached onto the terminal block 31, and a resin cover 35 which is placed over the resin block 33. These electrical components 5 are attached to a bottom part (surfaces except the opening parts) of the case 3.

The grommets 25 are attached to the electric wires 15 connected to the battery side and the electric wires 17 connected to the electric motor side, respectively, and crimped terminals 37 and 39 are connected to one ends of these electric wires, respectively. Crimped terminals are connected to both ends of the electric wires 13 connected to the power supply side, in which crimped terminals 41 at one ends are connected to and held in the resin block 33, and crimped terminals (not shown in the figure) at the other ends are connected to a connector 43.

The terminal block 31 is a resin molded article which has stepped supporting surfaces (two steps) which support the bus bars 29, and has a roughly cuboid-formed base 45 and quadratic prism-formed columnar parts 47 which are spaced from each other for a predetermined interval and raised from the base 45. Supporting surfaces which support the bus bars 29, respectively, are formed on the top surface of the base 45 and the top surfaces of the columnar parts 47. Metal female members 49 which are spaced from each other and have a screw hole are embedded in the supporting surface of the base 45. Metal columnar projections 51 are provided respectively by being raised on the supporting surfaces of the columnar parts 47, and each of the projections 51 is provided with a groove where a nut to be described below is fitted.

The bus bars 29 are formed by bending a metal plate into a stepped shape, and two surfaces of the bus bars 29 which abut with those supporting surfaces of the terminal block 31 onto which the bus bars 29 abuts and are attached are provided with insertion holes 53 and 55, respectively.

The resin block 33 is a resin molded article which holds a pair of crimped terminals of the electric wires 13 connected to the power supply side, and has an accommodating room 57 which accommodates the pair of crimped terminals by partitioning the crimped terminals with a resin wall, and an embedded part 59 which is embedded between the columnar parts 47 of the terminal block 31. The two crimped terminals 41 held by the resin block 33 are adapted to be held by the resin block 33 in a state that one end side of each of the crimped terminals 41 is accommodated in the accommodating room 57, and the other end side of each of the crimped terminals 41 projects beyond the accommodating room 57. The resin block 33 is so adapted that when the resin block 33 is attached onto the terminal block 31, the other end sides of the crimped terminals 41 are arranged at positions where it is possible to abut with the bus bars 29.

The resin cover 35 is a resin member which surrounds the resin block 33 and the terminal block 31, and has two partitioning walls 61 which extend with a predetermined interval from each other to respectively partition the columnar parts 47 and the projections 51 of the terminal block 31, and a connecting part 63 which connects the two partitioning walls 61. The resin cover 35 is arranged so that the connecting part 63 faces the top surface of the resin block 33, and the connecting part 63 is provided with a locking hole 67 into which a locking projection 65 which rises from the top surface of the resin block 33 is inserted.

The insulative member 9 is a frame-like resin molded article made of insulative resin, and two ends of the insulative member 9 open. By forming the insulative member 9 in accordance with the shape of the inner wall surfaces of the case 3, the insulative member 9 may be attached along the inner wall surfaces of the case 3. The four corners of the insulative member 9 are provided with projecting plates 69 which perpendicularly project from the inner wall surfaces, and the projecting plates 69 are provided with insertion holes 71 of bolts which fix the insulative member 9 to the bottom part of the case 3.

Like the insulative member 9, the insulative lid 11 is a resin molded article made of insulating resin, and by forming the insulative lid 11 in accordance with the inner wall surfaces of the cover 7, the insulative lid 11 may be attached along the inner wall surfaces of the cover 7. The cover 7 is adapted to be attached by bolts or screws.

Next, an example of assembling the electrical junction box 1 is described. First, the insulative member 9 is incorporated into the case 3, and the insulative member 9 is attached along the inner wall surfaces of the case 3. By inserting bolts 73 into the insertion holes 71 formed in the projecting plates 69 of the insulative member 9, the insulative member 9 is fixed to the case 3.

Next, the terminal block 31 is incorporated into the case 3, and by inserting a bolt 75 into a bolt hole of the terminal block 31, the terminal block 31 is fastened to the bottom part of the case 3. Then, the two bus bars 29 are attached to the supporting surfaces of the terminal block 31 which is fixed to the case 3. At this time, the projections 51 of the terminal block 31 are inserted into the insertion holes 55 at one ends of the bus bars 29, and the insertion holes 53 at the other ends of the bus bars 29 are arranged in accordance with the positions of the screw holes of the female members 49. Then, the electric wires 15 connected to the battery side and the electric wires 17 connected to the electric motor side are inserted through the electric wire through holes 23 of the case 3, respectively. In a state that insertion holes 77 formed in the crimped terminals 37 of the electric wires 15 connected to the battery side are aligned with the insertion holes 53 at the other ends of the bus bars 29, by inserting bolts 79 (fastening member) (FIG. 2) into the holes and making the bolts 79 to be threadedly engaged into the screw holes of the female members 49, the electric wires 15 are connected to the terminal block 31.

On the other hand, among the crimped terminals which are connected to the electric wires 13 connected to the power supply side, those crimped terminals at one ends are connected to the connector 43, and those crimped terminals at the other ends are connected to the resin block 33. The connector 43 is fitted in an accommodating hole of the connector (not shown in the figure) formed at the bottom part of the case 3. In this state, the resin block 33 which holds the crimped terminals 41 at the other ends of the electric wires 13 is attached onto the terminal block 31. In particular, along the projections 51 of the terminal block 31, mounting holes 81 of the crimped terminals 41 which project beyond the accommodating room 57 of the resin block 33 and mounting holes 83 formed in the crimped terminals 39 of the electric wires 17 connected to the electric motor side are overlaid sequentially, and nuts 85 (fastening member) (FIG. 2) are threadedly engaged with the projections 51. At this time, the embedded part 59 of the resin block 33 is embedded between the two columnar parts 47 of the terminal block 31. In this way, the electric wires 13, 15 and 17 are connected with each other through the bus bars 29 of the terminal block 31. The grommets 25 of the electric wires 15 and 17 are fitted and installed into the electric wire through holes 23, and are fixed to the case 3 with screws not shown in the figure.

Figure 2:
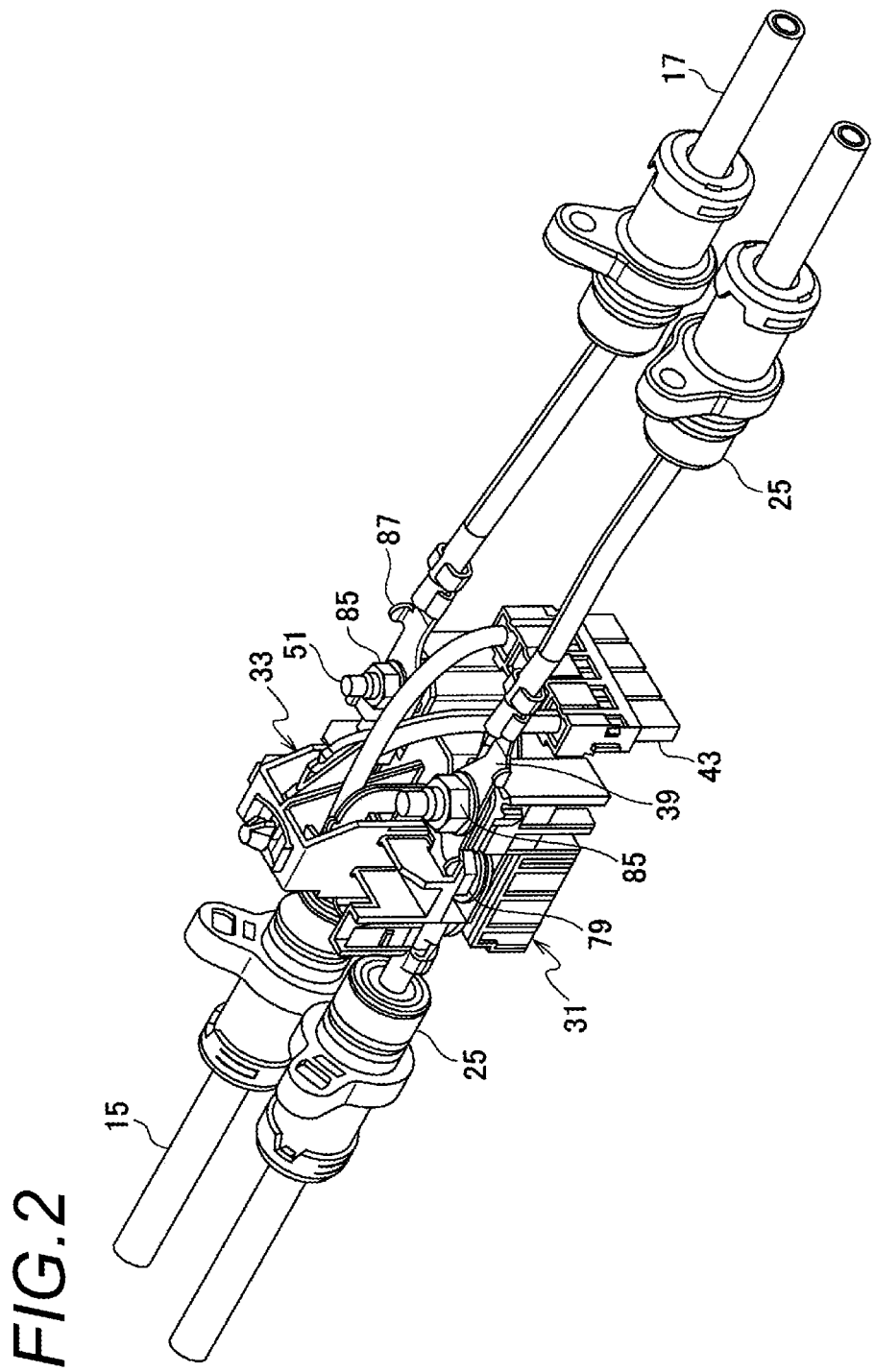
FIG. 2 is an appearance perspective view of electrical components accommodated in a case of FIG. 1.

The appearance of the electrical components 5 (including the electric wires) installed in the case 3 in this way is shown in FIG. 2.

Then, the resin block 33 is covered with the resin cover 35. The resin cover 35 is attached to the resin block 33 when the resin cover 35 is locked by inserting the locking projection 65 of the resin block 33 into the locking hole 67 of the resin cover 35.

According to the present embodiment, since the insulative member 9 is attached along the inner wall surfaces of the case 3, without coating the conductors of the electrical components 5 accommodated in the case, the short circuit of the conductors and the case 3 can be prevented with a simple construction. Because the resin molded article which can be attached in the inner wall surfaces of the case 3 can be used as the insulative member 9, the production cost can be controlled in comparison with that the conductors are coated with resin, and the production is economical. Furthermore, because the insulative member 9 is attached along the inner wall surfaces of the case 3, when the electrical components 5 are assembled in the case 3, it can be prevented that the particular operation space gets extremely small, and because the operation space can be secured, the efficiency of the assembling operation can be improved. Furthermore, in addition to the insulative member 9, by using the insulative lid 11, the short circuit of the conductors and the case 3 can be prevented more surely.

Figure 3:
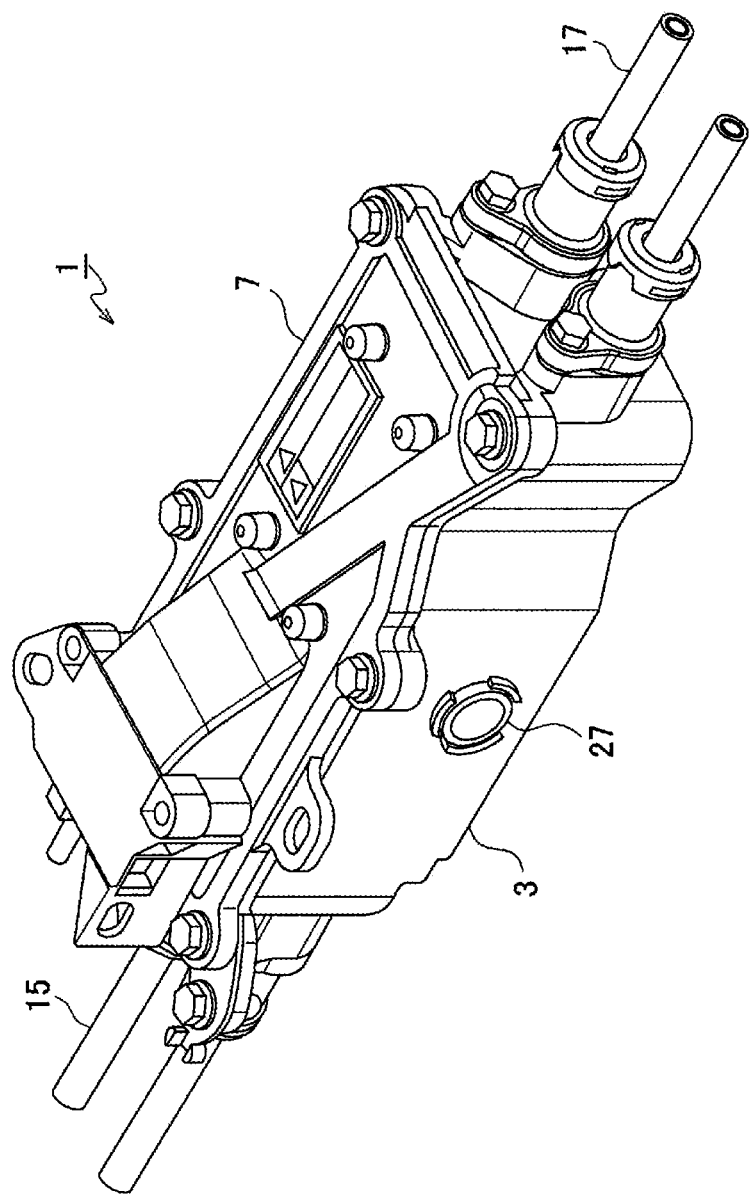
FIG. 3 is an appearance perspective view of the electrical junction box according to the present disclosure.

The case 3 is sealed when bolts to which the cover 7 is attached are fastened to the opening part of the case 3 through the packing 21. Although the opening part of the case 3 at the opposite side is opened, the case 3 is completely sealed when the opening part is attached to the other component (not shown in the figure) through the packing 19. The appearance of the electrical junction box 1 which is in a state that the cover 7 is attached is shown in FIG. 3.

By fastening the nuts 85, the crimped terminals 39 of the electric wires 17 connected to the electric motor side are connected to the bus bars 29 while being pivotally supported by the projections 51. Therefore, when the nuts 85 are fastened, the crimped terminals 39 may rotate in the rotating direction of the nuts 85 due to the friction of the nuts 85 and the crimped terminals 39. Thus, when the crimped terminals 39 rotate, for example, not only the crimped terminals 39 or the electric wires 17 may be damaged, but also the connected state of the electric wires 17 may be influenced.

Figure 4:
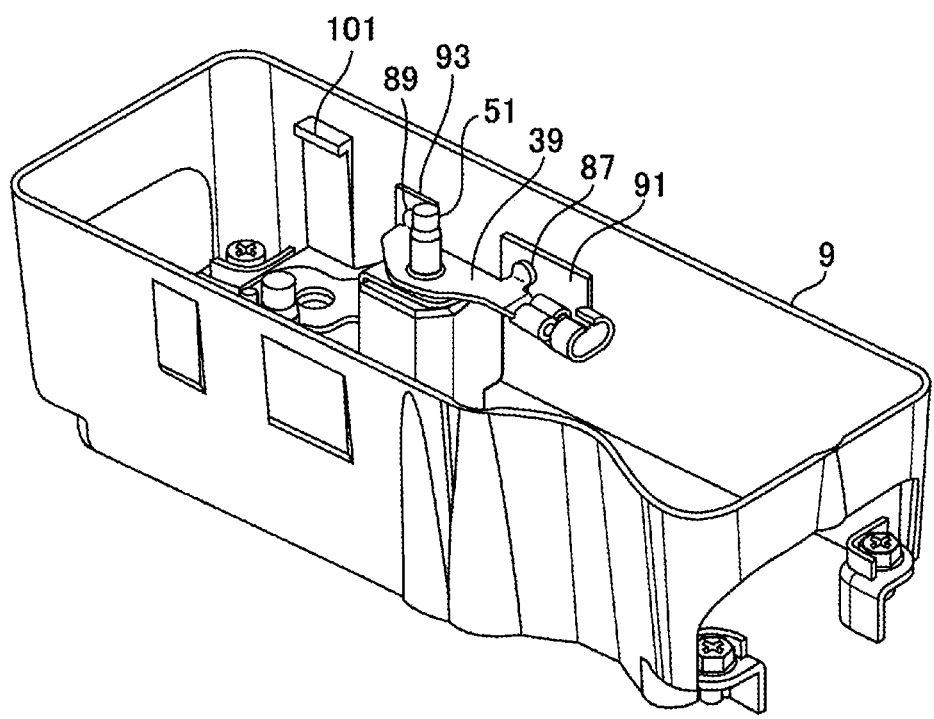
FIG. 4 is a perspective view which describes a structure which prevents the rotation of crimped terminals.
Figure 5:
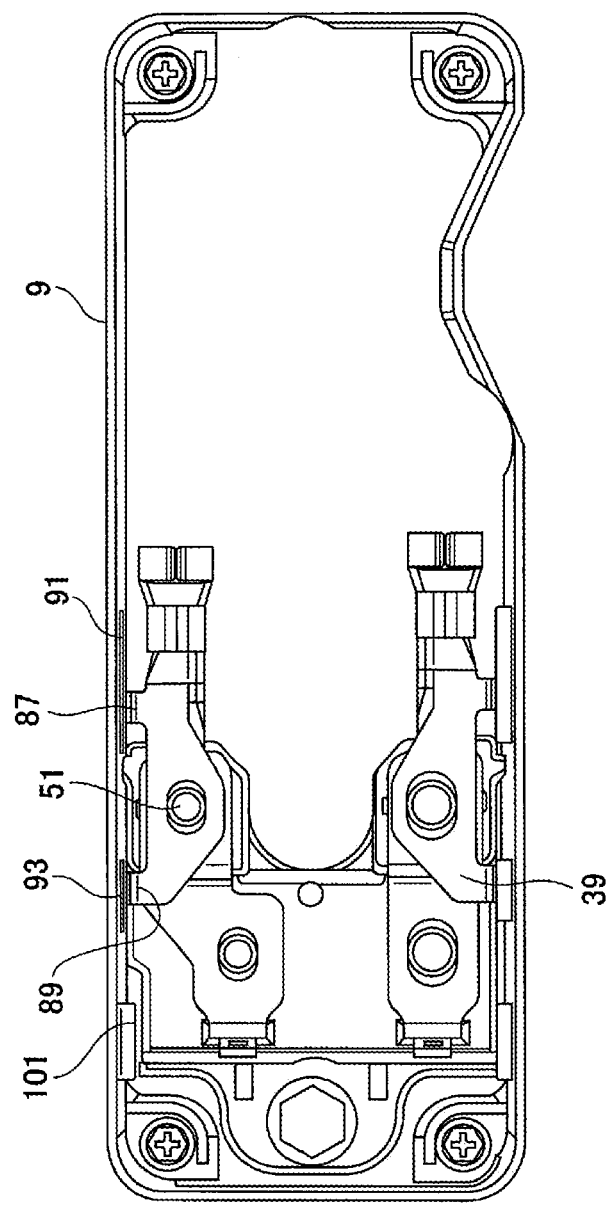
FIG. 5 is a top view which describes the structure which prevents the rotation of the crimped terminals.

In this embodiment, as shown in FIGS. 4 and 5, the crimped terminal 39 has a first extension 87 and a second extension 89 which extend in parallel with each other along a horizontal direction from around the mounting hole 83. In a top view, in a state that the crimped terminal 39 is pivotally supported by the projection 51, the first extension 87 and the second extension 89 are arranged at two sides of a line crossing perpendicularly the axis core of the projection 51 and an inner wall surface of the insulative member 9, and extends perpendicularly towards the inner wall surface of the insulative member 9, respectively.

The insulative member 9 is provided with a first stepped part 91 on the inner wall surface opposed to the first extension 87, and a second stepped part 93 on the inner wall surface opposed to the second extension 89. The first stepped part 91 and the second stepped part 93 are formed by respectively projecting from the inner wall surface of the insulative member 9, and when the crimped terminal 39 is pivotally supported by the projection 51, the first extension 87 and the second extension 89 abut against the corresponding stepped parts at the same time, respectively. Thereby, because the rotation of the crimped terminal 39 around the projection 51 is regulated, even when the crimped terminal 39 is fastened with the nut 85, there is no rotation of the crimped terminal 39 with the nut 85. In addition, because the rotating of the crimped terminal 39 in a direction reverse to the rotation direction of the nut 85 is regulated, even when the crimped terminal 39 is removed by loosing the nut 85, there is no rotation of the crimped terminal 39 with the nut 85.

In the present embodiment, the crimped terminals 39 are provided with the two extensions and the insulative member 9 is provided with the two stepped parts, but it is also possible that, for example, only the first stepped part 91 located on the inner wall surface of the insulative member 9 with which the crimped terminal 39 that rotates at the time of fastening the nut 85 can abut is provided without providing the first extension 87 and the second extension 89. In this case, the first stepped part 91 is set to abut with the crimped terminal 39 when the crimped terminal 39 is pivotally supported by the projection 51.

On the other hand, in the present embodiment, when the resin block 33 is assembled, if the resin block 33 is attached onto the terminal block 31 in a state that one ends of the electric wires 13 are connected to the connector 43 which is arranged at the bottom part of the case 3 and the other ends of the electric wires 13 are connected to the resin block 33, the nuts 85 must be fastened with the projections 51 passing through the mounting holes 81 of the crimped terminals 41 while the electric wires 13 are curved largely. In this case, the resin block 33 rises from the terminal block 31 by the reaction force of the curved electric wires 13, and the operation efficiency might decrease.

In this embodiment, to prevent such a rise of the resin block 33, locking mechanisms which are engaged with each other to regulate the movement of the resin block 33 in a direction opposite to the direction the resin block 33 is attached, namely the direction the resin block 33 rises, is provided between the resin block 33 and the insulative member 9.

As shown in FIGS. 6A and 6B, at two side surfaces facing the inner wall surfaces of the insulative member 9, the resin block 33 is provided respectively with locking arms 95 of a cantilever shape which elastically deform towards a direction perpendicular to the side surfaces. The locking arms 95 are formed by raising from a distal end part in the attaching direction when the resin block 33 is brought dose to the terminal block 31 and attached onto the terminal block 31, namely, an end surface 97 facing the terminal block 31, towards the direction opposite to the attaching direction. The side surfaces of the locking arms 95 facing the inner surfaces of the insulative member 9 are provided with first projecting bars 99 which extend in a direction perpendicular to the direction the resin block 33 is attached and project from the side surfaces. The first projecting bars 99 are formed to have a slope or a curved surface in the direction the locking arms 95 rise. On the other hand, at positions facing the side surfaces of the locking arms 95, the inner surfaces of the insulative member 9 are provided with second projecting bars 101 which extend in a direction perpendicular to the direction the resin block 33 is attached and project, respectively.

With such a construction, when the resin block 33 is pushed into the case 3 to be attached to the terminal block 31, the first projecting bars 99 of the pair of locking arms 95 ride on the second projecting bars 101 of the insulative member 9, respectively, so that the two locking arms 95 deform elastically towards a direction to approach each other. When the first projecting bars 99 get over the second projecting bars 101, the locking arms 95 return to the state before the elastic deformation so that the first projecting bars 99 are locked to the second projecting bars 101. Therefore, since the movement of the resin block 33 in the direction opposite to the attaching direction is regulated when the locking arms 95 are locked to the insulative member 9, the rise of the resin block 33 at the time of attaching can be prevented and the operation efficiency can be improved.

In the present embodiment, the insulative member 9 is fixed to the case 3 when bolts pass through the bolt insertion holes 71 of the projecting plates 69 projecting perpendicularly from the inner wall surfaces of the insulative member 9 and are threadedly engaged into bolt holes at the case side. However, if the bolts are exposed in the case 3, the conductive members accommodated in the case 3 and the bolts may contact and there may be a short circuit. Further, if the electric wires contact with the bolts and receive vibration from the outside, the electric wire may rub and be worn.

Figure 7:
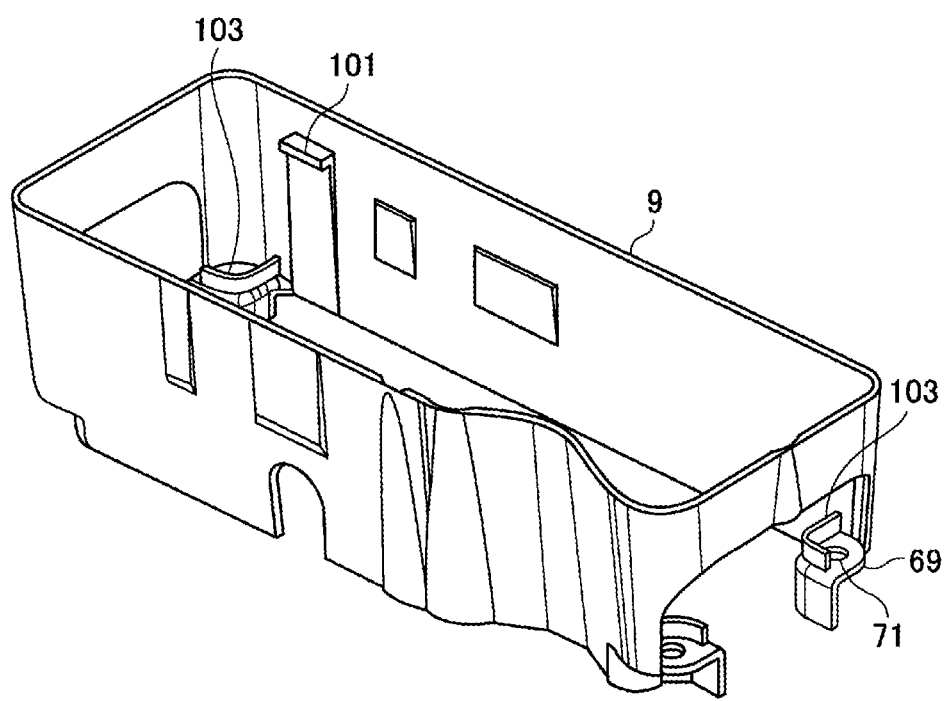
FIG. 7 is an appearance perspective view of an insulative member accommodated in the case of FIG. 1.
Figure 8:
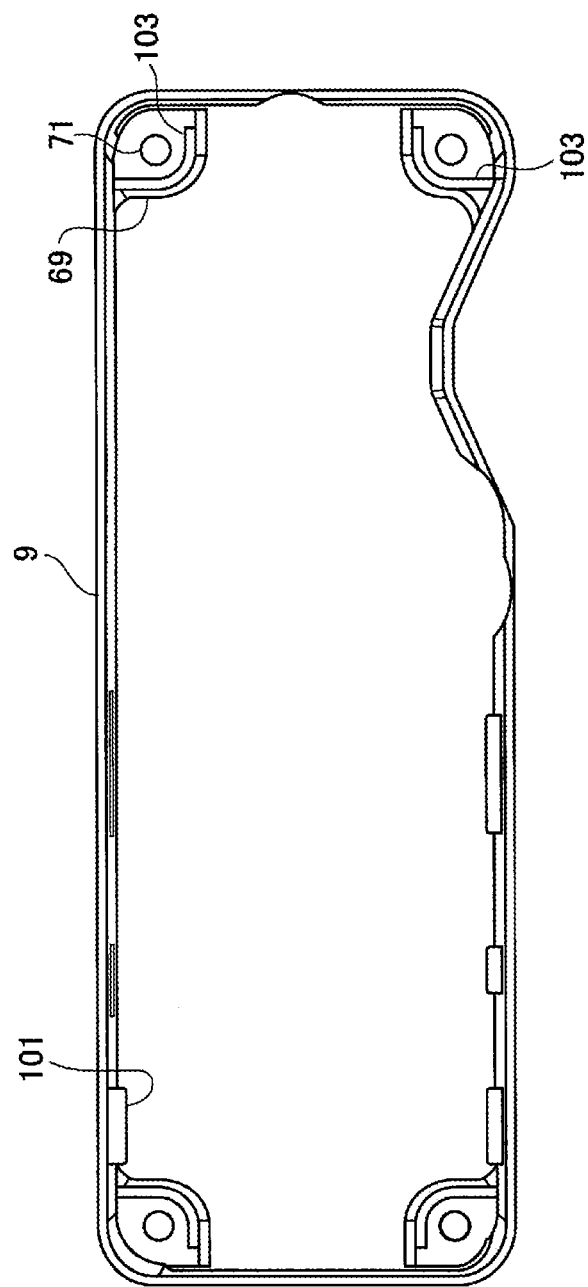
FIG. 8 is a top view of the insulative member accommodated in the case of FIG. 1.

In contrast, in the present embodiment, as shown in FIGS. 7 and 8, ribs 103 are formed by rising from around the bolt insertion holes 71 of the projecting plates 69 to surround the heads of the bolts. Thereby, because the contact of the electric wires and the heads of the bolts can be avoided, the wear of the electric wires can be prevented.

It is desired that the height of the ribs 103 is set to be higher than the height of the heads of the bolts.

Figure 9B:
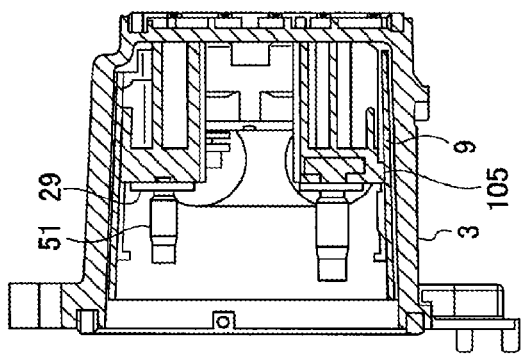
FIG. 9B is a sectional view from the direction B-B arrows of FIG. 9A.
Figure 9A:
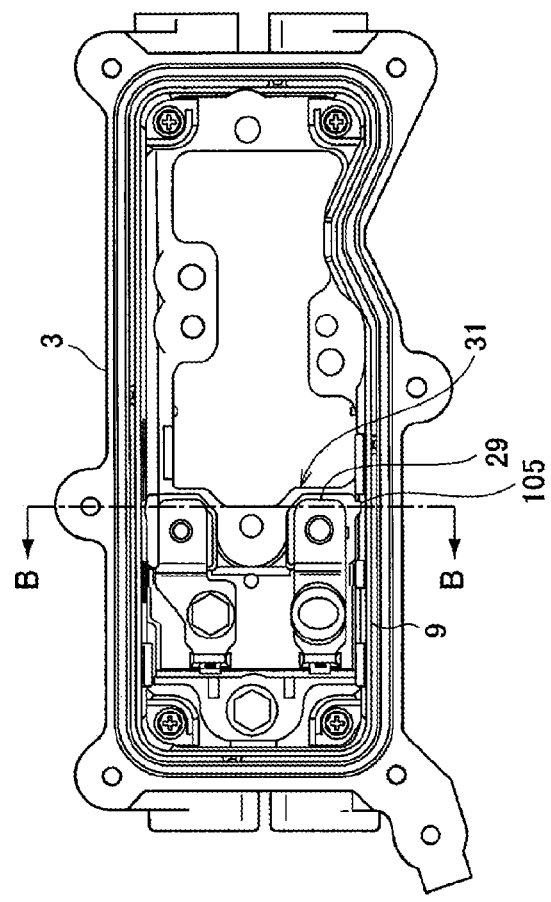
FIG. 9A is a top view showing the construction of convex parts with which a terminal block of FIG. 1 is provided.
Figure 9C:
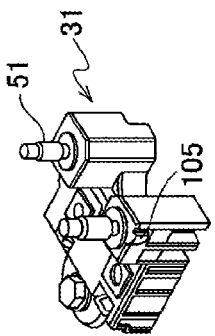
FIG. 9C is an appearance perspective view of the terminal block.

In the present embodiment, because the insulative member 9 is a resin molded article, after the insulative member 9 is attached into the case 3, a curve occurs at the inner side of the case 3, and the operation space in the case might get small. In this regard, in the present embodiment, as shown in FIGS. 9A to 9C, since the two side surfaces of the terminal block 31 facing the inner wall surfaces of the insulative member 9 are provided with convex parts 105 that press the insulative member 9 towards the side of the case 3, respectively, the curve of the insulative member 9 can be corrected, and a drop of the operation efficiency due to the decrease of the operation space can be prevented.

The embodiment of the present disclosure is described above in detail with reference to the figures, but the above embodiment is only an illustration of the present disclosure, and the present disclosure is not limited to the constructions of the above embodiment. It is apparent that those modifications in design or the like in a range of not departing from the subject matter of the present disclosure are included in the present disclosure.

For example, in the present embodiment, an example is described in which three systems of electric wires, namely, the electric wires 13 connected to the power supply side, the electric wires 15 connected to the battery side and the electric wires 17 connected to the electric motor side are connected, but the present disclosure is not limited to such a combination, especially in terms of loads, and the present disclosure can be applied to electric wires which are connected to various loads which are loaded on a vehicle except the battery and the electric motor.

In the present embodiment, the bolts 79 are used to attach the crimped terminals 37 and 41 to the bus bars 29 and the nuts 85 are used to attach the crimped terminals 39 to the bus bars 29, but the present disclosure is not limited to this example and either fastening members of bolts and nuts may be used.

According to the present disclosure, a short circuit of the case and the conductors can be prevented while the shielding performance is maintained, and the cost is decreased and the efficiency of the operation of assembling the components is improved.

What is claimed is:

1. An electrical junction box for connecting a power supply and a load, comprising:
    a terminal block that holds a conductor to which a first electric wire and a second electric wire are commonly connected, the first electric wire being connected to the power supply and the second electric wire being connected to the load;
    a conductive case that accommodates the terminal block; and
    a resin insulative member that is attached along an inner wall surface of the case,
    wherein crimped terminals which are connected respectively to ends of the first and second electric wires are fastened to the conductor with fastening members,
    wherein the crimped terminal connected to the second electric wire is pivotally supported by a columnar projection, which is protruded from the terminal block, and is fastened with the fastening member; and
    wherein the in wall surface of the insulative member has a stepped part which regulates a rotation of the crimped terminals with the fastening member when the fastening member is fastened, the stepped part being project from the inner wall surface at a position where the stepped part abuts with the crimped terminal.

2. The electrical junction box according to claim 1, wherein the insulative member has a projecting plate which projects perpendicularly from the inner wall surface of the insulative member; and
    wherein the projecting plate has:
        an insertion hole for a bolt which fixes the insulative member to a bottom part of the case; and
        a rib which surrounds a head of the bolt inserted into the insertion hole.

3. The electrical junction box according to claim 1, wherein a convex part which presses the insulative member to the case is provided on a surface of the terminal block, the surface of the terminal block facing the inner wall surface of the insulative member.

4. An electrical junction box for connecting a power supply and a load, comprising:
    a terminal block that holds a conductor to which a first electric wire and a second electric wire are commonly connected, the first electric wire being connected to the power supply and the second electric wire being connected to the load;
    a conductive case that accommodates the terminal block; and
    a resin insulative member that is attached along an inner wall surface of the case,
    wherein crimped terminals which are connected respectively to ends of the first and second electric wires are fastened to the conductor with fastening members,
    wherein other crimped terminal is connected to one end of the first electrical wire and is attached to a connector arranged at a bottom part of the case;
    wherein the crimped terminal is connected to the other end of the first electrical wire and is held to an insulative resin block;
    wherein the insulative resin block is so formed that when the insulative resin block is attached onto the terminal block, the crimped terminal connected to the other end of the first electric wire is arranged at a position where the crimped terminal is connected to the conductor; and
    wherein the insulative resin block and the insulative member are provided with locking mechanisms which are engaged with each other when the crimped terminal connected to the other end of the first electric wire is fastened to the conductor with a fastening member, the locking mechanisms regulates a movement of the insulative resin block in a direction opposite to a direction in which the insulative resin block is attached to the insulative member.

\* \* \* \* \*